United States Patent [19]
Damratowski

[11] 3,913,621
[45] Oct. 21, 1975

[54] LINEAR VALVE CONTROL MECHANISM

[75] Inventor: Leonard P. Damratowski, Monroeville, Pa.

[73] Assignee: Carrier Corporation, Syracuse, N.Y.

[22] Filed: May 29, 1974

[21] Appl. No.: 474,475

[52] U.S. Cl. ............... 137/630.2; 137/601; 251/251
[51] Int. Cl.² .......................................... F16K 1/00
[58] Field of Search ............ 137/601, 630.15, 630.2; 251/251

[56] References Cited
UNITED STATES PATENTS

| | | | |
|---|---|---|---|
| 203,494 | 5/1878 | Perkins | 137/630.2 |
| 822,261 | 6/1906 | Emmet | 137/630.2 X |
| 3,421,539 | 1/1969 | McLarty | 251/251 X |
| 3,625,241 | 12/1971 | Shields | 137/601 X |

*Primary Examiner*—Robert G. Nilson
*Attorney, Agent, or Firm*—J. Raymond Curtin; Thomas J. Wall

[57] ABSTRACT

A mechanism for controlling the actuation of a linear series of fluid admission valves suitable for use in the steam chest of a turbine wherein the valves are moved upwardly from the valve seats by means of a cam bar having a cam track for controlling the movement of each valve. The cam bar is reciprocated linearly along a predetermined path of travel that is parallel to the valve series. The bar is supported within a frame secured to the turbine steam chest, the frame supporting two parallel rows of roller bearings or sliding contacts arranged to ride upon the top and bottom surfaces of the bar. A bifurcated member, each arm of which extends adjacent to the planar side walls of the bar, is rotatably attached to a cam follower passing through each cam track, the member being further secured to a valve so that a prescribed motion is translated thereto. As the bar is reciprocated in a linear direction parallel to the valve series, the valves are opened and closed in a predetermined sequence.

6 Claims, 4 Drawing Figures

LINEAR VALVE CONTROL MECHANISM

BACKGROUND OF THE INVENTION

This invention relates to a mechanism for controlling the actuation of a linear series of fluid admission valves and, in particular, to a relatively low friction valve lifting mechanism for use in steam turbines.

Conventionally, in steam turbine machines utilizing a linear series of steam admission valves, the valve actuating means have heretofore been generally complex in structure requiring a substantial amount of power to operate. One prevalent form of valve actuating means consists of a rocker shaft having arms connected to a lifting bar to which the valves are operatively connected. Because of the arcuate motion described by the rocker arm, the forces required to actuate each valve in the series is of a different magnitude. Often times, the forces required to lift the end valves in the series, that is, the valves nearest the pivot point of the shaft, are extremely high because of the low mechanical advantage of the system in this region. Because of the non-uniformity of forces involved and the high lifting forces periodically encountered, the driving mechanism for lifting the valves is subjected to rapidly changing loads of relatively high magnitude capable of having an adverse effect upon the driving device and thus limiting the useful life of the system.

SUMMARY OF THE INVENTION

It is therefore an object of the present invention to improve lifting mechanisms for controlling the actuation of a linear series of fluid admission valves as particularly utilized in steam turbines.

It is a further object of the present invention to provide a relatively low friction lifting mechanism capable of actuating a series of steam admission valves.

Yet another object of the present invention is to provide a valve lifting mechanism capable of opening and closing a series of steam admission valves wherein each valve in the series may be actuated by the application of a uniform force.

A still further object of the present invention is to provide a means for sequencing and overlapping the actuation of valves in a series to obtain accurate control over the valve function.

These and other objects of the present invention are attained by means of a valve lifting device including a rigid frame mounted adjacent to a linear series of steam admission valves, the frame having two parallel rows of roller bearings rotatably supported therein, a planar cam bar mounted in the plane described by the linear series of valves having grooves formed in the top and bottom surfaces thereof in which the roller bearings move in rolling contact with the bar, cam tracks equal in number to the number of valves in the series formed in the bar, cam follower means arranged to trace the working profile of each cam track and being operatively connected to one of each valve in the series for translating a prescribed motion thereto, and drive means to reciprocate the cam bar between the rollers whereby the valves are opened and closed in a preselected order.

BRIEF DESCRIPTION OF THE DRAWINGS

For a better understanding of these and other objects of the present invention, reference is had to the following drawings which are to be read in conjunction with the description of the present invention wherein.

DESCRIPTION OF THE PREFERRED EMBODIMENT

Figure 2:
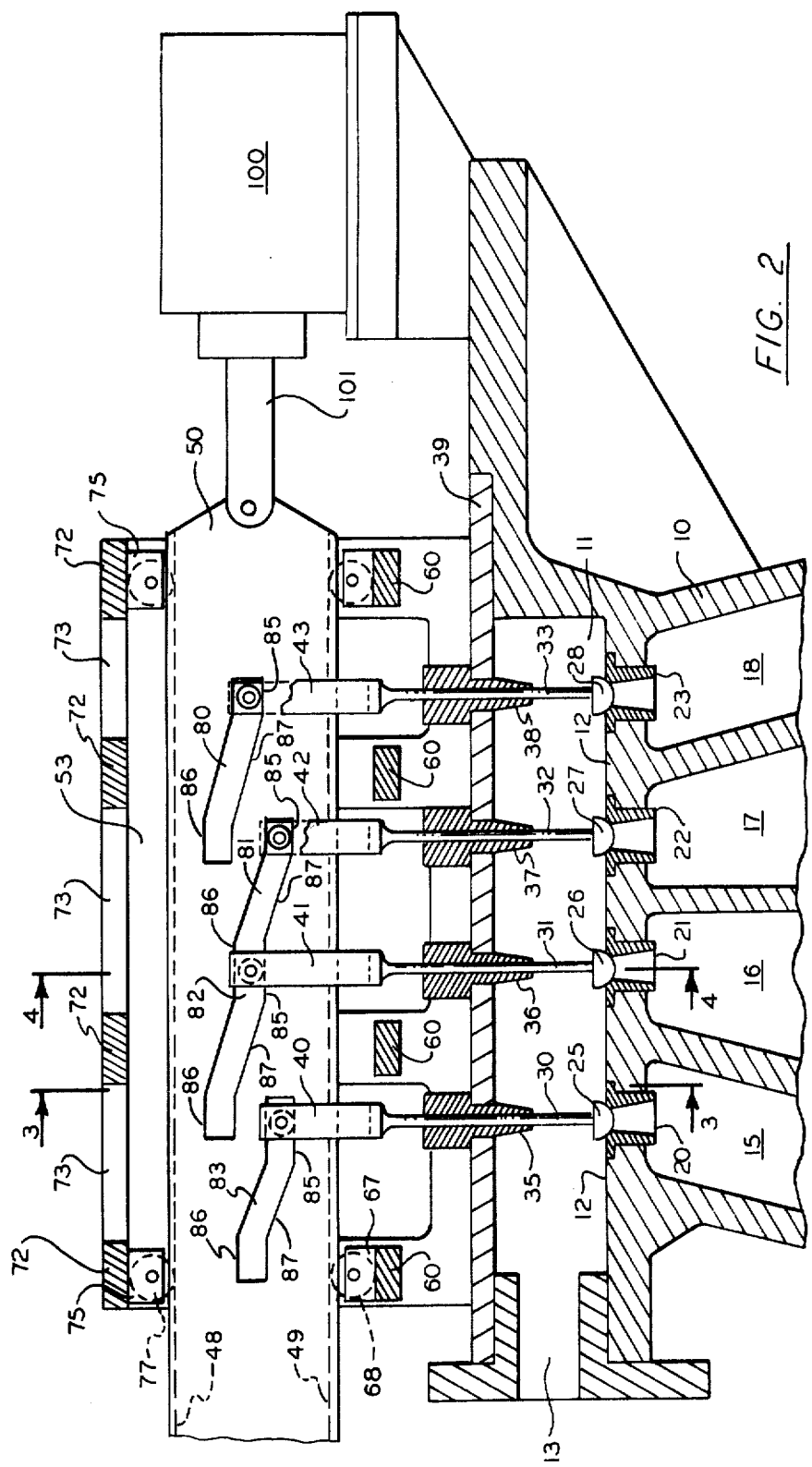
FIG. 2 is a sectional view of the valve control mechanism shown in FIG. 1, further illustrating the mounting thereof upon a turbine steam chest taken along lines 2—2 in FIG. 4.

Referring to FIG. 2, the steam turbine casing is shown at 10 and is formed with a steam chest 11 having a bottom wall 12 and a steam entrance passage 13. The bottom wall 12 is formed with apertures communicating with steam passages 15, 16, 17 and 18 leading to the turbine inlet nozzles. Baffle or vortex interrupters may also be provided to protect the valves from unwanted vibrations.

Valve seats 20, 21, 22 and 23 are mounted in the apertures in the bottom wall 12. Valves 25, 26, 27 and 28 are cooperable with the valve seats 20-23 respectively. Although four valves are shown for explanatory purposes, it should be clear that any number of valves can be similarly employed without departing from the teachings of the present invention. The valves are fixedly secured to stems 30, 31, 32 and 33 which are mounted for sliding movement in guide and sealing packing members 35, 36, 37 and 38. Bifurcated clevis members 40, 41, 42 and 43 are fixedly secured to the upper ends of the stems 30-33 with the arms thereof spanning the two side walls of the cam bar 50.

Figure 4:
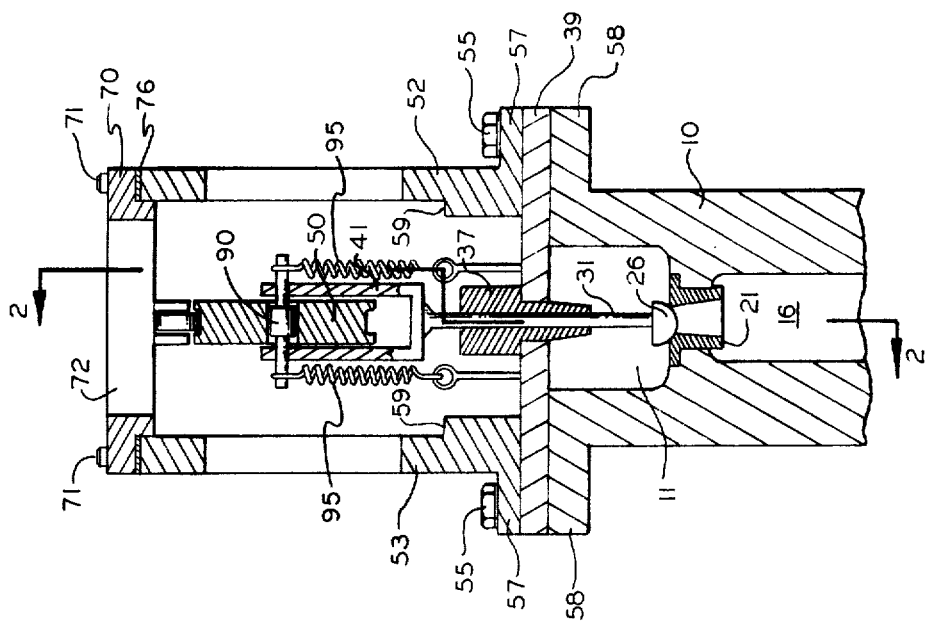
FIG. 4 is a sectional view similar to FIG. 3 taken along lines 4—4 in FIG. 2.
Figure 3:
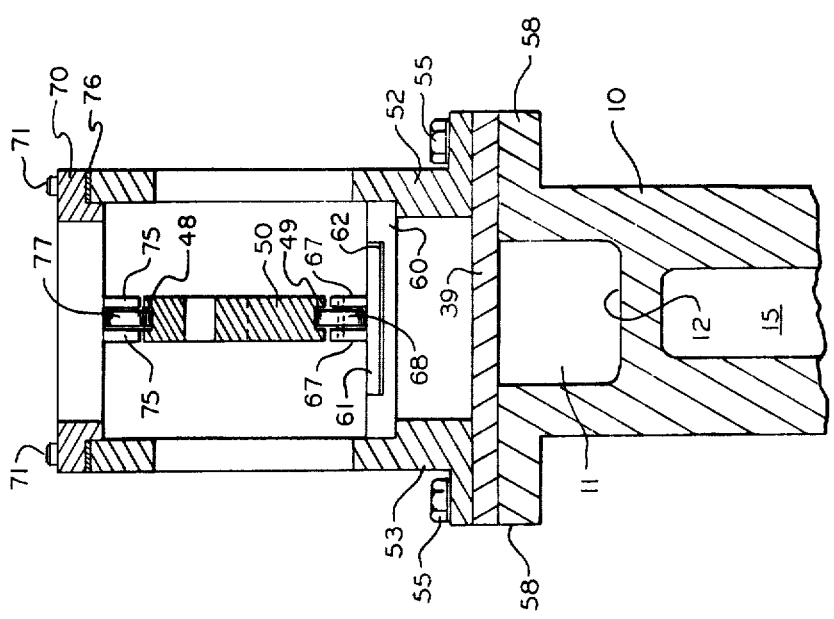
FIG. 3 is a vertical sectional view of the apparatus shown in FIG. 1 taken along lines 3—3 in FIG. 2.

In addition to the cam bar 50, the valve actuating mechanism includes side members 52, 53 mounted on the cover 39 forming the top wall of the steam chest 11. Cap screws 55 extend through laterally extending flanges 57 formed on the side members 52, 53 and through apertures in the cover 39 and are threaded into flanges 58 formed on the steam chest 11 (FIGS. 3 and 4). The side members 52, 53 are joined by fabricating, as by casting or welding, a horizontal cross member 60 therebetween. The cross member serves as a seat for supporting the bottom bearing support elements 61 therein. The elements are rabbit fitted into locating apertures formed in the cross member with shims 62 being provided therebetween for prepositioning the cam bar 50. After shimming, the elements are dowelled and bolted in place, thus locating the bottom rollers 68 in a desired position in respect to a lower cam bar groove 49 formed in the bottom surface of the bar.

Although antifriction roller bearings are disclosed in the preferred embodiment of the present invention, it should be clear that any type of low friction device can be similarly employed. When, for example, temperature consideration would restrict the usage of roller bearings, the bottom surface of the cam bar can be slidably mounted in the elements 61 within a selflubricating material such as graphitic bronze or the like.

A top plate 70 is positioned and fixed within the upper edges of the box-like structure 52, 53, 60 by means of cap screws 71. Shims 76 are provided between the bottom surface of the plate and the top surface of the structure which, in assembly, serve to position the cam bar in respect to the bearings supported upon the plate 70. The plate 70 is formed with transversely extending portions 72 defining access openings 73. The transversely extending portions 72 include spaced apart depending flanges 75 between which are journaled upper antifriction rollers 77. The rollers are received in a lengthwise extending groove 48 formed in the upper edge of the cam bar 50 in the manner described in reference to the lower rollers. Similarly, when applicable, a low friction material can be substituted for the roller to provide a sliding surface for bar 50.

The cam bar 50 is formed with cam tracks 80, 81, 82 and 83. The cam tracks are each formed with lower horizontally extending portions 85 and upper horizontally extending portions 86 joined by an inclined section 87. As illustrated clearly in FIG. 2, the middle cam tracks 81, 82 can be machined together within a single aperture with the upper portion of the first track 81 forming the lower portion of the second track 82. Although for illustrative purposes, the cam track shown in FIG. 2 would actuate the valves in a closely spaced sequence, it is contemplated that the sequence of operation and lift characteristics of the mechanism can be considerably altered to encompass any variety of operating orders, time periods, and motion profiles desired. In fact, the instant lifting can also deliver an overlapping lift between two or more valves, thus providing a control feature heretofore difficult or impossible to achieve employing lifting devices found in the prior art.

Figure 1:
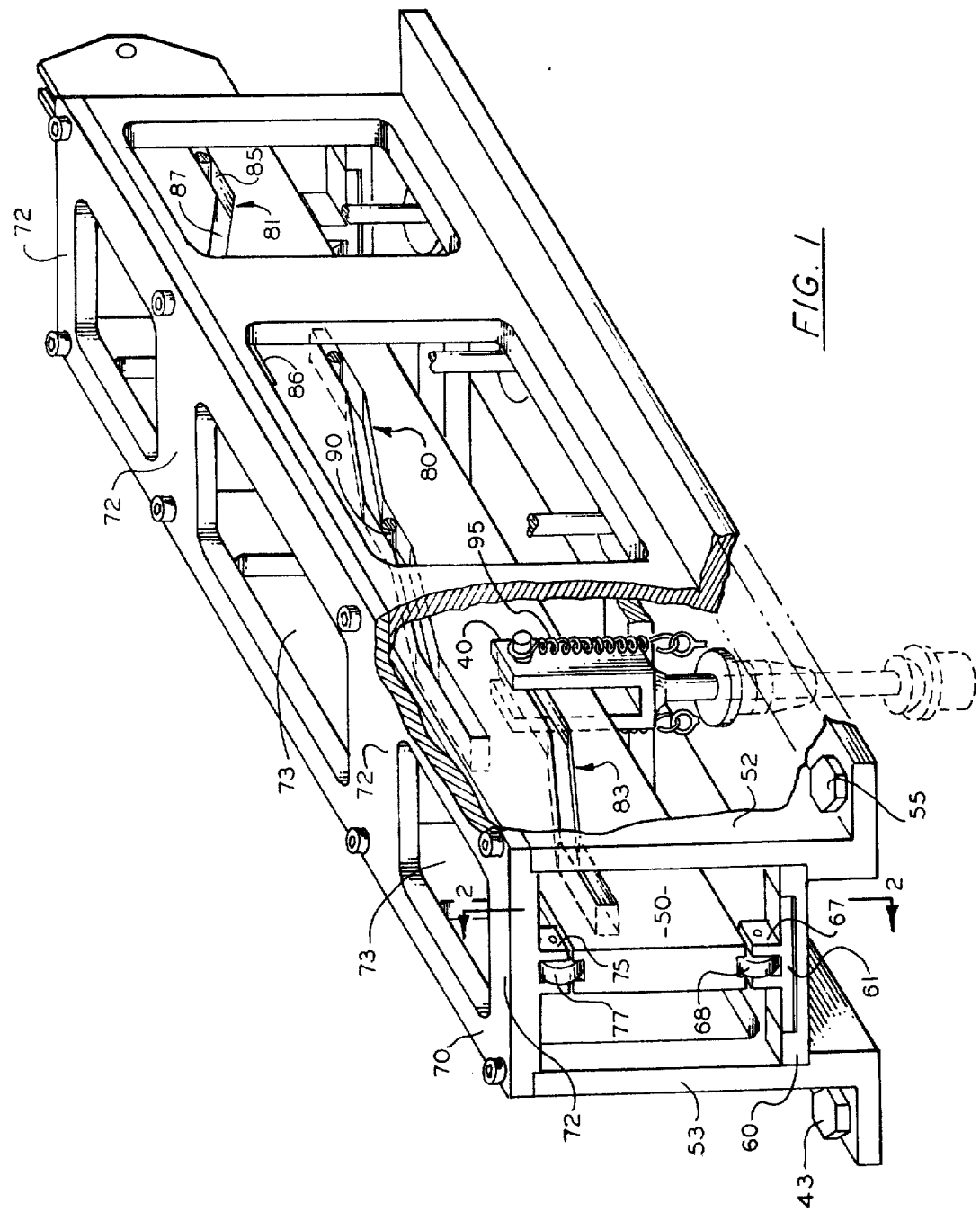
FIG. 1 is a perspective view of the linear valve control embodying the teachings of the present invention having sections broken away to better illustrate the operable features thereof.

As noted, the clevis members 41-43, fixed to the upper ends of the valve stems 30-33, straddle the cam bar 50 as seen in FIGS. 1, 3 and 4. Each clevis carries an antifriction roller or cam follower 90 positioned in the cam tracks. The followers are rotatably supported at each end within an arm of the clevis and are arranged to translate the prescribed cam motion to the associated valve as the follower traces the cam profile. As shown in FIG. 1, springs 95 deliver a biasing force to the followers to hold the followers in contact with the working surface of each cam, thus minimizing backlash in the system.

In FIG. 2, the cam bar is shown in retarded position wherein the rollers 90 and the clevis members 41-43 are all mounted in the lower portions 85 of the cam tracks and the valves 25-28 are engaging the valve seats 20-23, see FIG. 2. When the cam bar 50 is moved to the right in FIG. 2 toward advanced position, the followers 90 move along the working surface of the cam tracks sequentially passing from the lower portions 85 of the cam tracks upwardly over inclined portions 87 into the upper portions 86.

With the cam bar in retarded position as shown in FIG. 2, the cam followers 90 are positioned in the portions 85 of the cam slots different distances from the lower ends of the inclined sections 87. With this arrangement, if the cam bar is moved toward an advanced position, the valves are lifted sequentially from the valve seats. For example, the cam follower roller in the clevis 42 is spaced closer to the lower end of the inclined section 87 of the cam track 81 than is the cam follower roller 90 in clevis 43. Accordingly, if the cam bar 50 is moved toward an advanced position, the valve 27 is elevated from the seat 22 prior to the upward movement of valve 28 from the valve seat 23. The arrangement or location of the follower 90 in the clevis 41 is positioned in the area 86 such that the valve 26 is elevated subsequent to the elevation of valve 28. The cam follower 90 and clevis 40 are positioned the greatest distance from the inclined portion 87 of the cam slot 83 and accordingly, valve 25 is the last to be elevated from the seat.

The bar 50 is reciprocated in a lengthwise direction from a retarded to an advanced position and returned to the retarded position by means of a servo motor 100 or any similar device known in the art. The motor is connected by a stem 101 to the cam bar 50 with the motor being arranged to respond to input provided by the turbine governor (not shown). In practice, the bar 50 is of sufficient length so that contact is continuously maintained with the four bearing surfaces as the bar is reciprocated through its path of travel.

While for purposes of illustration a preferred embodiment of this invention has been described, it will be apparent that the invention may be otherwise embodied within the scope of the following claims.

What is claimed is:

1. An actuating mechanism for regulating the flow of fluid through a linear series of admission valves including
   a frame mounted adjacent to the valve series having two parallel rows of roller bearings supported within said frame, each bearing row being located within the linear plane described by the valve series,
   a planar cam bar mounted for movement within said linear plane between the two parallel rows of bearings, the bar having two parallel opposed walls containing grooves being arranged to ride in moving contact with said two rows of bearings as said bar moves in said plane,
   cam tracks formed in said bar, each track being operatively connected to one of said valves in said series for translating a lifting motion thereto, and
   means to reciprocate said cam bar within said plane whereby said valves are opened and closed in a prescribed order in response to the motion translated thereto by said cam tracks.

2. The apparatus of claim 1 wherein at least two rollers in each row are in rolling contact with said cam bar at all times as the bar moves through its reciprocating path of travel.

3. The apparatus of claim 1 wherein each cam track is a clear aperture passing through the planar walls of the bar and being operatively connected to one of said valves by a bifurcated member, the arms of which span the planar walls of the bar and are pivotally connected to a cam follower passing through the cam track.

4. The apparatus of claim 3 further including a biasing means for urging the cam follower against the working profile of the cam track.

5. The apparatus of claim 4 wherein the cam tracks are arranged to translate motion to more than one valve in the series at one time whereby the opening of said valves can be controlled in an overlapping order.

6. The apparatus of claim 1 further including means for adjusting the positioning of said bearing surfaces in respect to the cam bar whereby the distance between the bar and the valves is controllable.

* * * * *